(12) United States Patent
Langendijk et al.

(10) Patent No.: US 10,365,471 B1
(45) Date of Patent: Jul. 30, 2019

(54) ELECTROWETTING DISPLAY DEVICE INCLUDING DIFFUSE COLOR FILTER

(71) Applicant: Amazon Technologies, Inc., Seattle, WA (US)

(72) Inventors: Erno Hermanus Antonius Langendijk, Eindhoven (NL); Tulasi Sridhar Reddy Guntaka, Eindhoven (NL); Kari Juhani Rinko, Helsinki (FI)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/975,346

(22) Filed: Dec. 18, 2015

(51) Int. Cl.
*G02B 26/00* (2006.01)
*G02B 5/20* (2006.01)
*G02B 5/02* (2006.01)

(52) U.S. Cl.
CPC ......... *G02B 26/005* (2013.01); *G02B 5/0278* (2013.01); *G02B 5/201* (2013.01)

(58) Field of Classification Search
CPC .... G02B 26/005; G02B 5/201; G02B 5/0278; G03F 7/2008; Y10T 29/49002
USPC ........................................................ 359/290
See application file for complete search history.

(56) References Cited

U.S. PATENT DOCUMENTS

| | | | |
|---|---|---|---|
| 8,730,555 B2 | 5/2014 | Aubert et al. | |
| 8,908,254 B2 | 12/2014 | Feenstra et al. | |
| 2010/0321760 A1* | 12/2010 | Hayes | G02B 26/005 359/290 |
| 2013/0208337 A1* | 8/2013 | Lee | G02B 26/005 359/290 |
| 2013/0264595 A1* | 10/2013 | Hong | G02B 26/02 257/91 |
| 2014/0016178 A1 | 1/2014 | Rosser | |
| 2014/0210809 A1* | 7/2014 | Slack | G02B 26/005 345/212 |
| 2014/0211291 A1* | 7/2014 | Feenstra | G02B 26/005 359/290 |
| 2014/0285869 A1* | 9/2014 | Giraldo | G02B 26/005 359/290 |

OTHER PUBLICATIONS

Non-Final Office Action Rejection dated Dec. 17, 2014 for corresponding U.S. Appl. No. 14/299,756 (now U.S. Pat. No. 9,097,888).

* cited by examiner

*Primary Examiner* — Stephone B Allen
*Assistant Examiner* — Rahman Abdur
(74) *Attorney, Agent, or Firm* — EIP US LLP

(57) ABSTRACT

A display device includes a bottom support plate and an opposing top support plate. A pixel region is positioned between the bottom support plate and the top support plate. The pixel region includes a plurality of sub-pixels. A color filter layer is positioned within the pixel region. The color filter layer includes a plurality of color filters, wherein each color filter is positioned within a respective sub-pixel. A diffusion layer is positioned on a first surface of the top support plate between the top support plate and the color filter layer.

12 Claims, 6 Drawing Sheets

ELECTROWETTING DISPLAY DEVICE INCLUDING DIFFUSE COLOR FILTER

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the quality of a display may affect a user's experience with the electronic device and the content presented thereon. Accordingly, enhancing user experience and satisfaction continues to be a priority.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
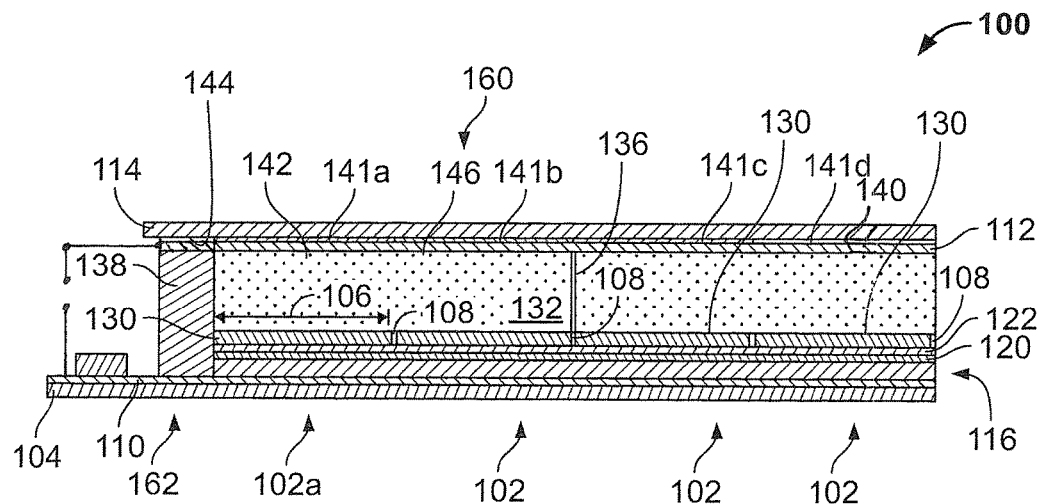
FIG. 1 is a cross-sectional view of the example electrowetting display device of FIG. 3 along sectional line 1-1, according to one embodiment.

In embodiments described herein, an electrowetting display device includes a diffusion layer positioned with respect to a color filter layer to provide optimal diffusion, e.g., a relatively wide viewing angle, while limiting a reduction in sharpness and resolution. In certain embodiments, colors within an RGBW sub-pixel configuration are mixed by the diffusion layer. In the example embodiments, the diffusion layer is positioned above the color filter layer, either directly on the color filter layer or at a predetermined distance from the color filter layer. The predetermined distance between the diffusion layer and the color filter layer is generally shorter than a thickness of a conventional glass top support plate, e.g., 300 micrometers to 500 micrometers. In example embodiments, the distance between the diffusion layer and the color filter layer is between 0 micrometers and 300 micrometers and, more particularly, between 50 micrometers and 200 micrometers. For example, in certain embodiments, the distance between the diffusion layer and the color filter layer is equal to or less than a dimension of a sub-pixel, e.g., a width along a short axis of the sub-pixel, of 50 micrometers to 100 micrometers. In certain embodiments, a length along a long axis of the sub-pixel perpendicular to the short axis is 100 micrometers to 150 micrometers. In other embodiments, the distance between the diffusion layer and the color filter layer is equal to a shortest distance between a center point or a center line of a first sub-pixel and a center point or a center line of a second neighboring or adjacent sub-pixel, e.g., 55 micrometers to 115 micrometers, and, more particularly, 65 micrometers to 75 micrometers, with a width of the intervening pixel wall being 5 micrometers to 15 micrometers. In certain embodiments, the predetermined distance between the diffusion layer and the color filter layer depends on properties of the material used to form the diffusion layer including, for example, a concentration of diffuse particles within the diffusion layer, i.e., a diffusivity of the diffusion layer. In one embodiment, the distance between the diffusion layer and the color filter layer is based on a concentration of diffuse particles within the diffusion layer.

Moreover, with the diffusion layer directly above and contacting the color filter layer, i.e., a distance of 0 micrometers, slight mixing of colors between neighboring or adjacent sub-pixels occurs. With the diffusion layer at a relatively short distance above the color filter layer, e.g., a distance equal to a width of the sub-pixel, e.g., 50 micrometers to 100 micrometers and, more particularly, 60 micrometers, considerable mixing of colors between neighboring or adjacent sub-pixels occurs, but only slight mixing of colors with other sub-pixels, i.e., non-adjacent or non-neighboring sub-pixels or sub-pixels that do not surround the sub-pixel. In the example embodiments, the predetermined distance can be tuned for optimal performance between diffusion, e.g., viewing angle, and sharpness and resolution of the display.

In embodiments described herein, an electrowetting display device includes a reflective layer positioned under a pixel grid having a plurality of electrowetting pixels. Each electrowetting pixel is formed by one or more respective pixel walls to define a display surface area of the electrowetting pixel. The electrowetting pixels may have one or more specific and/or additional structural features. The reflective layer is positioned with respect to, e.g., within or under, each electrowetting pixel. In certain embodiments, the reflective layer may include one or more specular reflectors and/or one or more diffuse reflectors positioned with respect to, e.g., within or under, each electrowetting pixel. In certain embodiments, the reflective layer includes one or more specular reflectors made of a suitable material including, without limitation, a suitable metal, alloy, doped metal, or dielectric reflector material. In certain embodiments, the reflective layer includes one or more diffuse reflectors made of a suitable diffuse reflective material, such as titanium dioxide ($TiO_2$), for example.

During operation of the electrowetting display device, a voltage source applies a voltage over the electrode layers, i.e., a first or pixel electrode and a second or common electrode creating a voltage differential between the electrode layer and the common electrode to cause displacement of a fluid, such as a first fluid, contained within one or more electrowetting pixels or sub-pixels. Light entering an electrowetting display device in operation first travels through a top support plate, the light then travels through the diffusion layer where it is diffused and then through a color filter layer. The diffused light continues to travel through the electrowetting pixel or sub-pixel and impinges on the reflector layer positioned at or near a bottom of the electrowetting pixel or sub-pixel. The light is reflected by the reflective layer and then travels out of the electrowetting display device through the color filter layer, the diffusion layer, and the top support plate. As described herein, a distance between the color filter layer and the diffusion layer and/or a thickness of the diffusion layer may be selected or predetermined to optimize a performance of the electrowetting display device by optimizing the diffusion characteristics of the electrowetting display device while maintaining a desired sharpness and resolution level.

In general, the term "specular reflection" or "specular reflectance" refers to a mirror-like reflection of light from a surface in which light from a single incoming angle or direction (an incident ray) is reflected in a single outgoing angle or direction. In general, the term "diffuse reflection" or "diffuse reflectance" refers to the reflection of light from a surface in which an incident ray is reflected at more than one angle or direction, e.g., many angles or directions, rather than at only one angle or direction as in the case of specular reflection.

In various embodiments described herein, electronic devices include electrowetting displays for presenting content. In some examples, the electronic devices may include one or more components associated with the electrowetting display, such as a touch sensor component layered atop the electrowetting display for detecting touch inputs, a front light and/or a back light component for lighting the electrowetting display, and/or a cover layer component, which may include anti-glare properties, anti-reflective properties, anti-fingerprint properties, and/or anti-cracking properties, for example.

An electrowetting pixel (or sub-pixel) is defined by one or more pixel walls that surround or are otherwise associated with at least a portion of the electrowetting pixel. The pixel walls form a structure that is configured to contain at least a portion of a first fluid, such as an opaque oil. Light transmission through the electrowetting pixel is controlled by the application of an electric potential to the electrowetting pixel, which results in a movement of a second fluid, such as an electrolyte fluid or an electrolyte solution, into the electrowetting pixel, thereby displacing the first fluid.

When the electrowetting pixel is in an off state (i.e., with no electric potential applied), the first fluid, e.g., the opaque oil, is distributed throughout the electrowetting pixel to substantially cover the display surface area of the electrowetting pixel. Depending on the color of the first fluid, the first fluid absorbs light and the electrowetting pixel in this condition appears colored in certain embodiments. For example, for a black opaque first fluid, the light is absorbed by the first fluid and the electrowetting pixel in this condition appears black. But when the electric potential is applied, the electrowetting pixel is in an on state and the first fluid is displaced to one or more sides of the electrowetting pixel, for example. Light can then enter the electrowetting pixel and impinge upon a surface of the reflective layer positioned at or near a bottom surface of the electrowetting pixel. The light is then reflected by the reflective layer and reflects out of the electrowetting pixel, causing the electrowetting pixel to appear bright, e.g., white, to an observer. If the one or more reflective surfaces reflect only a portion of the light spectrum or if color filters are incorporated into the electrowetting pixel structure, the electrowetting pixel may appear to have color.

A display device, such as an electrowetting display device, may include a transmissive, reflective or transflective display that generally includes an array of pixels (e.g., which may comprise sub-pixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and the gate lines that are electrically connected to transistors (e.g., used as switches) included in each pixel. Transistors occupy a relatively small fraction of the area of each pixel to allow light to efficiently pass through (or reflect from) the pixel. In certain embodiments, a pixel includes two or more sub-pixels of an electrowetting display device. Such a pixel or sub-pixel may be the smallest light transmissive, reflective or transflective pixel of a display that is individually operable to directly control an amount of light transmission through or reflection from the pixel. For example, in some embodiments, a pixel includes a red sub-pixel, a green sub-pixel, and a blue sub-pixel for RGB displays or a red sub-pixel, a green sub-pixel, a blue sub-pixel, and a white sub-pixel for RGBW displays. In other embodiments, a pixel may be a smallest component, e.g., the pixel does not include any sub-pixels.

The array of pixels or a pixel region including a plurality of pixels is sandwiched between two support plates, such as a bottom support plate and an opposing top support plate. For example, a bottom support plate in cooperation with a top support plate may contain pixels that include electrowetting oil, electrolyte solution and pixel walls between the support plates. The support plates may be made of any suitable material including, without limitation, glass, plastic, or other transparent materials, and may be made of a rigid material or a flexible material, for example. Pixels include various layers of materials built upon the bottom support plate. One example layer is an amorphous fluoropolymer (AF1600®) with hydrophobic behavior. The pixel walls may be formed on a top surface of the hydrophobic layer, or, alternatively, may be formed before the hydrophobic layer is deposited, for example. The bottom support plate may be opaque while the top support plate is transparent. Describing a pixel or material as being "transparent" generally means that the pixel or the material may transmit a relatively large fraction of the light incident upon it. For example, a transparent material or a layer might transmit more than 70% or 80% of the light impinging on its surface, although in other examples a transparent material or structure might transmit a different percentage of incident light. In general, transparent materials or structures need not be perfectly transparent.

Hereinafter, example embodiments include, but are not limited to, reflective electrowetting displays having a clear or transparent top support plate and a bottom support plate, which need not be transparent. In general, "top" and "bottom" may be used to identify opposing support plates of an electrowetting display and do not necessarily refer to a direction referenced to gravity or to a viewing side of the electrowetting display device. In example embodiments, the top support plate is the surface through which pixels of a (reflective) electrowetting display are viewed.

As described above, individual reflective electrowetting pixels may include an electrode layer containing the drive electronics like TFTs, source lines, and gate lines on the bottom support plate, a reflective layer adjacent to or on the electrode layer, a pixel electrode on the reflective layer, a barrier layer on the reflective layer, and a hydrophobic layer on the barrier layer. The reflector layer itself can act as the pixel electrode or an additional pixel electrode, e.g., indium tin oxide (ITO), can be deposited on the reflector layer. The pixel electrode in principle is close to the fluids in the pixel to minimize power consumption. In one embodiment, the pixel electrode is deposited over the reflective layer. In an alternative embodiment, the pixel electrode is under the reflective layer. The electrode layer as shown, for example, in FIGS. 1 and 2 can be an electrode layer containing the drive electronics if the reflective layer is used as the electrode or the electrode layer can contain the pixel electrodes. Pixel walls of each pixel, the hydrophobic layer, and the transparent top support plate at least partially enclose a fluid region within the cavity that includes the first fluid which is electrically non-conductive, e.g., an opaque oil, retained in the individual electrowetting pixels by pixel walls, and the second fluid, e.g., an electrolyte solution, that is electrically conductive or polar and may be a water or a salt solution, such as a solution of potassium chloride in water. The second fluid may be transparent, but may be colored, or light-absorbing. The second fluid is immiscible with the first fluid. In general, substances are immiscible with one another if the substances do not substantially form a solution, although in a particular embodiment the second fluid might not be perfectly immiscible with the first fluid. In general, an "opaque" fluid is a fluid that appears black to an observer. For example, an opaque fluid strongly absorbs a broad spectrum of wavelengths (e.g., including those of red, green, and blue light) in the visible region of electromagnetic radiation appearing black. However, in certain embodiments an opaque fluid may absorb a relatively narrower spectrum of wavelengths in the visible region of electromagnetic radiation and may not appear perfectly black. In example embodiments, each of the first fluid and the second fluid is a liquid.

In some embodiments, the opaque fluid is a nonpolar electrowetting oil. In certain embodiments, the first fluid may absorb at least a portion of the visible light spectrum. The first fluid may be transmissive for a portion of the visible light spectrum, forming a color filter. For this purpose, the first fluid may be colored by addition of pigment particles or a dye. Alternatively, the first fluid may be black, for example by absorbing substantially all portions of the visible light spectrum, or reflecting. A reflective first fluid may reflect the entire visible light spectrum, making the layer appear white, or a portion of the entire visible light spectrum, making the layer have a color. In example embodiments, the first fluid is black and, therefore, absorbs substantially all portions of an optical light spectrum.

Spacers and edge seals mechanically connect the first support plate with the overlying, opposing second support plate, or form a separation between the first support plate and the second support plate, to contribute to the mechanical integrity of the electrowetting display device. Edge seals, for example, disposed along a periphery of an array of electrowetting pixels, may contribute to retaining fluids (e.g., the first fluid and the second fluid) between the first support plate and the overlying second support plate.

In some embodiments, the electrowetting display device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electrowetting display device. For example, display software may include code executable by a processor to modulate optical properties of individual pixels of the electrowetting display device based, at least in part, on electronic signals representative of a static image and/or video data. The code may cause the processor to modulate the optical properties of pixels by controlling electrical signals (e.g., voltages, currents, and fields) on, over, and/or in layers of the electrowetting display device.

Figure 2:
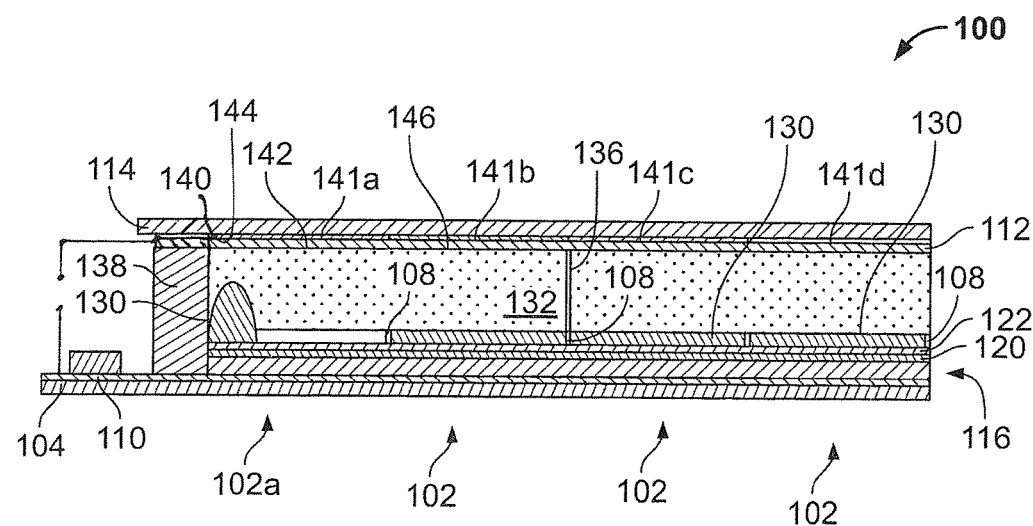
FIG. 2 is a cross-sectional view of the electrowetting display device of FIG. 3 along sectional line 1-1 with a first sub-pixel activated to expose at least a portion of a reflective layer.
Figure 3:
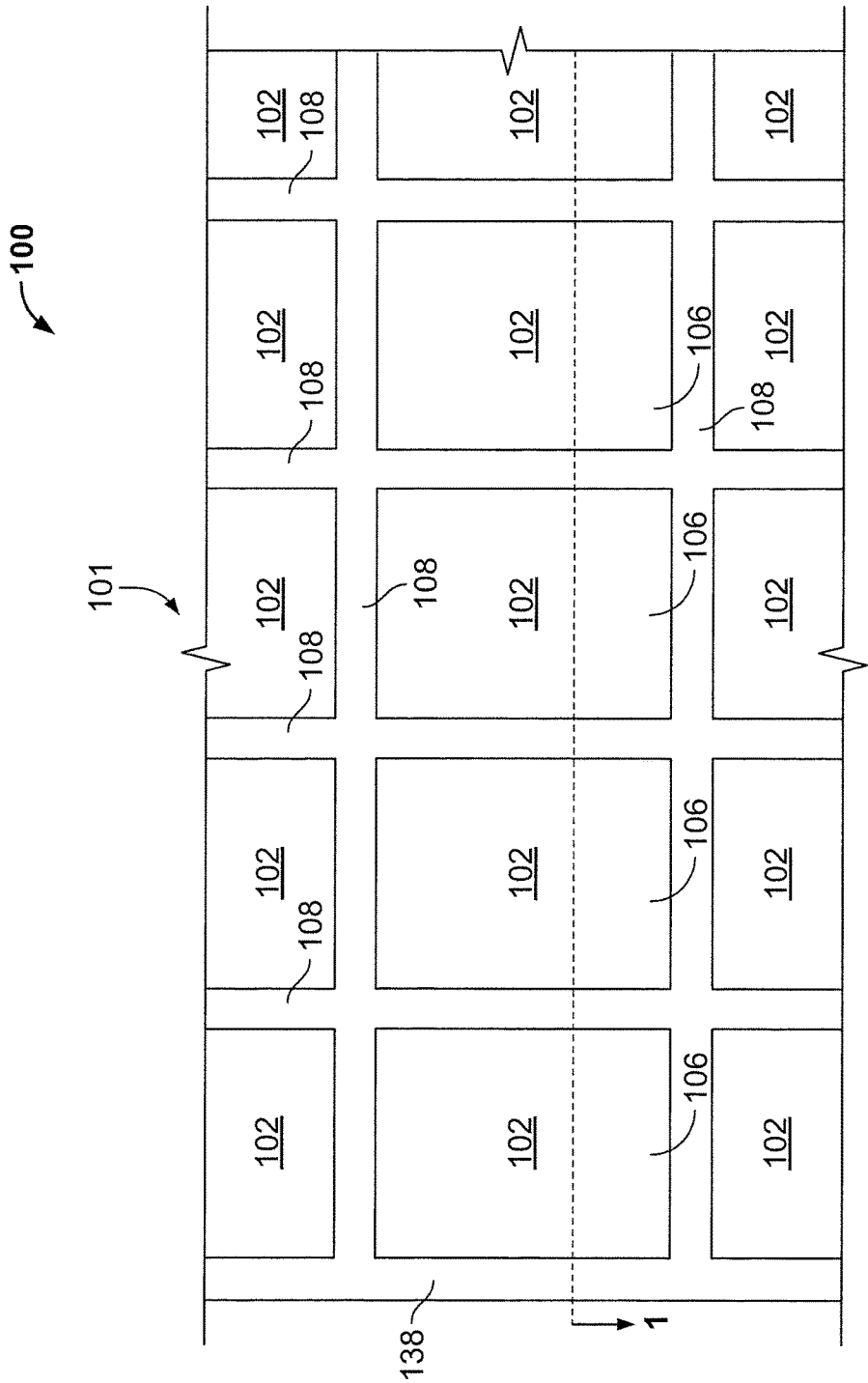
FIG. 3 is a top view of a plurality of electrowetting sub-pixels of an example electrowetting display device.

Referring now to the figures, FIG. 1 is a cross-sectional view of a portion of an example reflective electrowetting display device 100 including a pixel region having a pixel grid 101 with several electrowetting sub-pixels 102 taken along a sectional line 1-1 of FIG. 3. In the example embodiment, an electrowetting pixel includes a plurality of sub-pixels 102; for example, each pixel includes a red sub-pixel, a green sub-pixel, and a blue sub-pixel, as described below. In further embodiments, each pixel may also include a white sub-pixel for an RGBW pixel configuration. FIG. 2 shows the same cross-sectional view as FIG. 1 in which an electric potential has been applied to one electrowetting sub-pixel 102a causing displacement of a first fluid disposed therein, as described below. Four complete electrowetting sub-pixels 102 are shown in cross-section in FIGS. 1 and 2. FIG. 3 is a top view of example reflective electrowetting display device 100 including pixel grid 101 having a plurality of electrowetting sub-pixels 102 formed over a first or bottom support plate 104 (shown in FIGS. 1 and 2). As shown in FIG. 3, each electrowetting sub-pixel 102 defines a display surface area 106. More specifically, in this embodiment, sub-pixel 102 and display surface area 106 are defined by pixel walls 108, as described below, having a first dimension, such as a width, between opposing lateral pixel walls 108, and a second dimension, such as a length, between the remaining opposing pixel walls 108. Electrowetting display device 100 may include any number (usually a very large number, such as thousands or millions) of electrowetting sub-pixels 102. Sub-pixels 102 may have a width and a length of 50 micrometers to 500 micrometers. In the example embodiments, sub-pixels 102 have a width along a short axis of sub-pixel 102 of 50 micrometers to 100 micrometers and a length along a long axis of sub-pixel 102 of 100 micrometers to 150 micrometers, although in alternative embodiments sub-pixels 102 may have any suitable width and length. Further, in certain embodiments, the width of sub-pixels 102 is equal to the length of sub-pixels 102.

Referring further to FIGS. 1 and 2, an electrode layer 110 having one or more pixel electrodes is formed on bottom support plate 104. Electrode layer 110 and/or the one or more pixel electrodes are operatively coupled to a second or common electrode 112 positioned under a top support plate 114. In an example embodiment, electrode layer 110 includes a plurality of pixel electrodes, with one or more pixel electrodes associated with a respective pixel. In this embodiment, electrode layer 110 is coupled to common electrode 112 for creating, in conjunction with the common electrode, a voltage differential between electrode layer 110 and common electrode 112 to cause relative displacement of a first fluid, e.g., an oil, and a second fluid, e.g., an electrolyte fluid or an electrolyte solution, to expose at least a portion of a reflective layer. In this embodiment, common electrode 112 contacts the second fluid. These example embodiments are not limiting with respect to the location of the first and second electrode, and claimed subject matter is not limited in this respect. In particular embodiments, one or more additional layers may be positioned between electrode layer 110 and bottom support plate 104, in which TFTs, gates, and/or source lines are located, for example. In these embodiments, electrode layer 110 may not be formed directly on bottom support plate 104. In various embodiments, electrode layer 110 may be connected to any number of transistors, such as suitable thin film transistors (TFTs) (not shown), that are switched to either select or deselect corresponding electrowetting sub-pixels 102 using active matrix addressing, for example. A TFT is a particular type of field-effect transistor that includes thin films of an active semiconductor layer as well as a dielectric layer and metallic contacts over a supporting (but non-conducting) substrate, which may be glass or any suitable transparent or non-transparent material, for example.

A reflective layer 116 is positioned adjacent, e.g., on electrode layer 110, as shown in FIGS. 1 and 2, for example. In particular embodiments, one or more additional layers may be positioned between reflective layer 116 and electrode layer 110. In these embodiments, reflective layer 116 may not be formed directly on electrode layer 110. In an alternative embodiment, reflective layer 116 is positioned under a transparent electrode layer. In this alternative embodiment, reflective layer 116 is positioned between the transparent electrode layer 110 and bottom support plate 104. Reflective layer 116 may reflect light within the entire visible spectrum, making the layer appear relatively bright, or reflect a portion of light within the visible spectrum, making the layer have a color. In this embodiment, reflective layer 116 is positioned within the pixel region, e.g., within each electrowetting pixel or sub-pixel 102, to provide specular reflection.

As shown in FIGS. 1 and 2, reflective layer 116 is positioned on electrode layer 110 with respect to, e.g., within or under, electrowetting sub-pixel 102. One or more additional layers may be positioned between electrode layer 110 and reflective layer 116. In certain embodiments, reflective layer 116 is formed or made of any suitable materials including, for example, a metal (90%, 95% or greater than 95% metal), an alloy, a doped metal, or a dielectric reflector material. Suitable metal materials for reflective layer 116 include, without limitation, aluminum, silver, gold, copper, nickel, platinum, rhodium, lanthanum, and/or silicon nickel. Suitable alloy materials for reflective layer 116 include, without limitation, aluminum with copper or aluminum with nickel. In further alternative embodiments, reflective layer 116 is made of any suitable material providing a desired specular reflectance. In alternative embodiments, reflective layer may also include a suitable diffuse reflective material deposited on or over a portion of electrode layer 110. In this alternative embodiment, any suitable diffuse reflective material, such as titanium dioxide ($TiO_2$), providing a desired diffuse reflectance may be used.

Electrowetting sub-pixels 102 may have specific and/or additional structural features. Additionally or alternatively, reflective layer 116 may have structural features, for example, one or more relatively thinner areas and/or one or more relatively thicker areas within reflective layer 116 to control movement of the fluids. Alternatively, reflective layer 116 may be deposited on a structural feature conforming to a shape of the structural feature.

A suitable dielectric barrier layer 120 may at least partially separate electrode layer 110 from a hydrophobic layer 122, such as an amorphous fluoropolymer layer forming a bottom surface of electrowetting sub-pixel 102. For example, dielectric barrier layer 120 in certain embodiments is deposited on reflective layer 116. Dielectric barrier layer 120 may be formed from various materials including one or more organic material layers or a combination of organic and inorganic material layers. A thickness of the insulating dielectric barrier layer 120 may be less than 2 micrometers and may be less than 1 micrometer; for example, the insulating dielectric barrier layer 120 may be 400 nanometers or less in thickness. In some embodiments, hydrophobic layer 122 is an amorphous fluoropolymer layer including any suitable fluoropolymer(s), such as AF1600®, produced by DuPont, based in Wilmington, Del. Hydrophobic layer 122 is transparent in the example embodiment. Reflective layer 116 below hydrophobic layer 122 may reflect light within the entire visible spectrum, making the layer appear white, or reflect a portion of light within the visible spectrum, making the layer have a color.

In the example embodiment, a plurality of pixel walls 108 form patterned electrowetting pixel grid 101 on hydrophobic layer 122. Pixel walls 108 may include a photoresist material such as, for example, epoxy-based negative photoresist SU-8. Patterned electrowetting pixel grid 101 includes a plurality of rows and a plurality of columns that form an array of electrowetting pixels, such as shown in FIG. 3, including a plurality of electrowetting sub-pixels 102 having a width and a length in a range of about 50 to 500 micrometers, for example.

A first fluid 130, which may have a thickness (e.g., a height as shown in FIGS. 1 and 2 for example) in a range of about 1 to 10 micrometers, for example, overlays hydrophobic layer 122. First fluid 130 is partitioned by pixel walls 108 of patterned electrowetting pixel grid 101. A second fluid 132 overlays first fluid 130 and pixel walls 108 of patterned electrowetting pixel grid 101. In certain embodiments, as described above, second fluid 132 may be electrically conductive and/or polar. For example, second fluid 132 may be water or an aqueous solution, or a salt solution such as a solution of potassium chloride in water or a mixture of water and ethyl alcohol. In certain embodiments, second fluid 132 is transparent, but may be colored or absorbing. First fluid 130 is electrically non-conductive and may for example be an alkane like hexadecane or (silicone) oil. As described above, first fluid 130 is immiscible with second fluid 132.

As described above, hydrophobic layer 122 is arranged on bottom support plate 104 to create an electrowetting surface area. The hydrophobic character of hydrophobic layer 122 causes first fluid 130 to adjoin preferentially to hydrophobic layer 122 because first fluid 130 has a higher wettability with respect to a top surface of hydrophobic layer 122 than second fluid 132 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

Top support plate 114 covers second fluid 132 and one or more spacers 136 to maintain second fluid 132 over electrowetting pixel grid 101. In one embodiment, spacer 136 extends from top support plate 114 and may rest upon a top surface of one or more pixel walls 108. In alternative embodiments, spacer 136 does not rest on pixel wall 108 but is substantially aligned with pixel wall 108. This arrangement may allow spacer 136 to come into contact with pixel wall 108 upon a sufficient pressure or force being applied to top support plate 114. Multiple spacers 136 may be interspersed throughout electrowetting pixel grid 101. A seal 138 extends about a perimeter of electrowetting display device 100 to contain first fluid 130 and second fluid 132 within the fluid region of the cavity. A voltage applied across, among other things, second fluid 132 and electrode layer 110 of individual electrowetting sub-pixels 102 may control transmittance or reflectance of the individual electrowetting sub-pixels 102.

In example embodiments, a color filter layer 140 between the first or bottom support plate 104 and second or top support plate 114 is positioned over and aligned with the electrowetting pixel region, e.g., over or within a pixel including sub-pixels 102. Color filter layer 140 includes a plurality of color filters. For example, in the embodiment shown in FIGS. 1 and 2, color filter layer 140 includes one or more red color filters 141a, one or more green color filters 141b, and one or more blue color filters 141c. Color filter layer 140 is positioned over or within the pixel region such that each color filter of the plurality of color filters, e.g., red color filter 141a, green color filter 141b, and blue color filter 141c, is positioned over and aligned with, e.g., positioned within a respective sub-pixel 102 of the plurality of sub-pixels 102. In operation, i.e., when a sufficient potential is supplied to open the respective sub-pixel 102, with red color filter 141a positioned over the respective sub-pixel 102, the respective sub-pixel 102 will appear red in color; with green color filter 141b positioned over the respective sub-pixel 102, the respective sub-pixel 102 will appear green in color; and with blue color filter 141c positioned over the respective sub-pixel 102, the respective sub-pixel 102 will appear blue in color.

In example embodiments, a diffusion layer 142 is positioned between color filter layer 140 and top support plate 114 at a distance from color filter layer 140. As shown in FIGS. 4-7, diffusion layer 142 is positioned above color filter layer 140, either directly on color filter layer 140 or at a predetermined distance from color filter layer 140, between color filter layer 140 and top support plate 114. In the example embodiment, diffusion layer 142 is positioned over or within the electrowetting pixel region to provide additional diffusion of light entering and exiting electrowetting display device 100 as desired. More specifically, diffusion layer 142 is positioned on, e.g., applied to or deposited on, a first or inner surface 144 of top support plate 114 facing the pixel region, e.g., sub-pixels 102, between top support plate 114 and color filter layer 140. Color filter layer 140 is positioned on, e.g., applied to or deposited on, diffusion layer 142. Diffusion layer 142 may include any suitable diffusion material, such as small scattering particles capable of Mie scattering, for example. Suitable diffusion materials are commercially available from companies such as Nitto Denko, Lintec, Tomoegawa or other suppliers. In the example embodiment, diffusion layer 142 has a thickness of 50 micrometers to 200 micrometers. The thickness of diffusion layer 142 depends on material properties of diffusion layer 142 including, for example, a particle size and/or a distribution or concentration of particles within diffusion layer 142.

Figure 4:
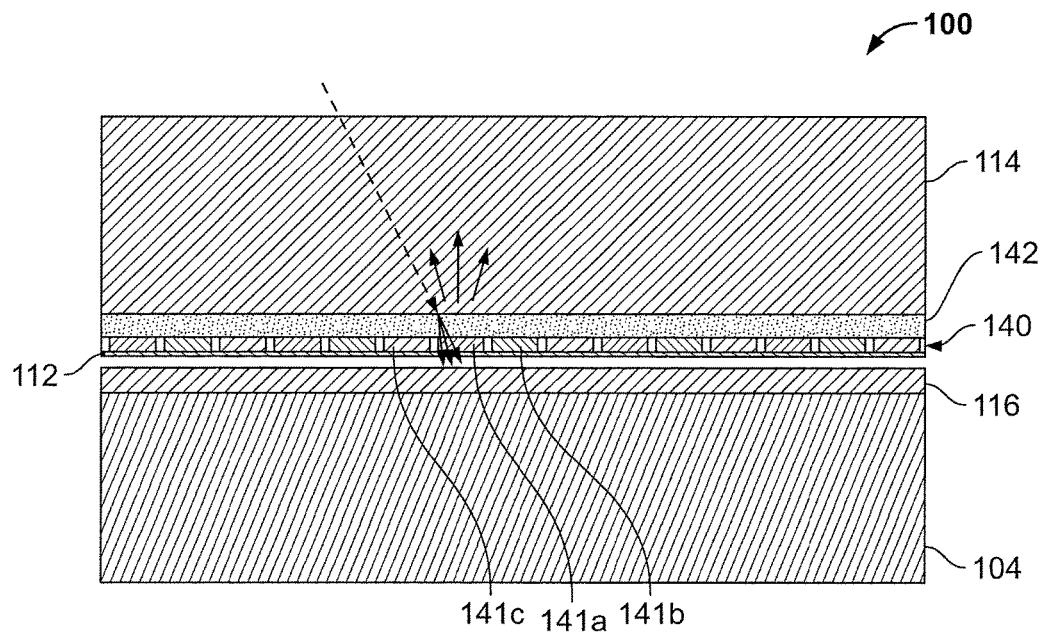
FIG. 4 is a partial cross-sectional view of an example electrowetting display device, according to one embodiment.
Figure 5:
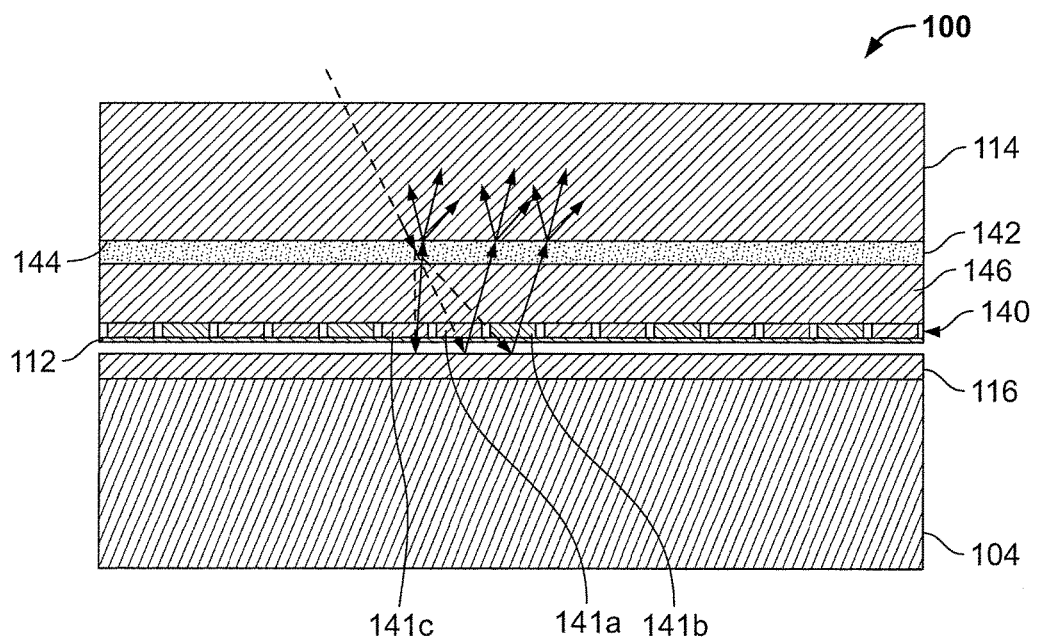
FIG. 5 is a partial cross-sectional view of an example electrowetting display device, according to one embodiment.
Figure 6:
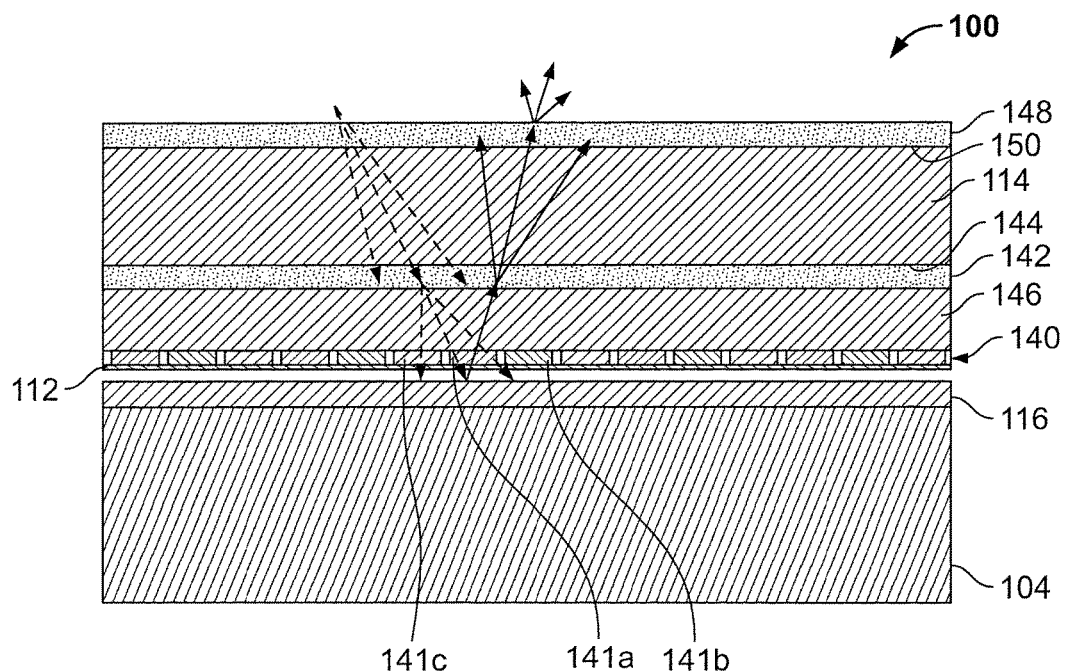
FIG. 6 is a partial cross-sectional view of an example electrowetting display device, according to one embodiment.
Figure 7:
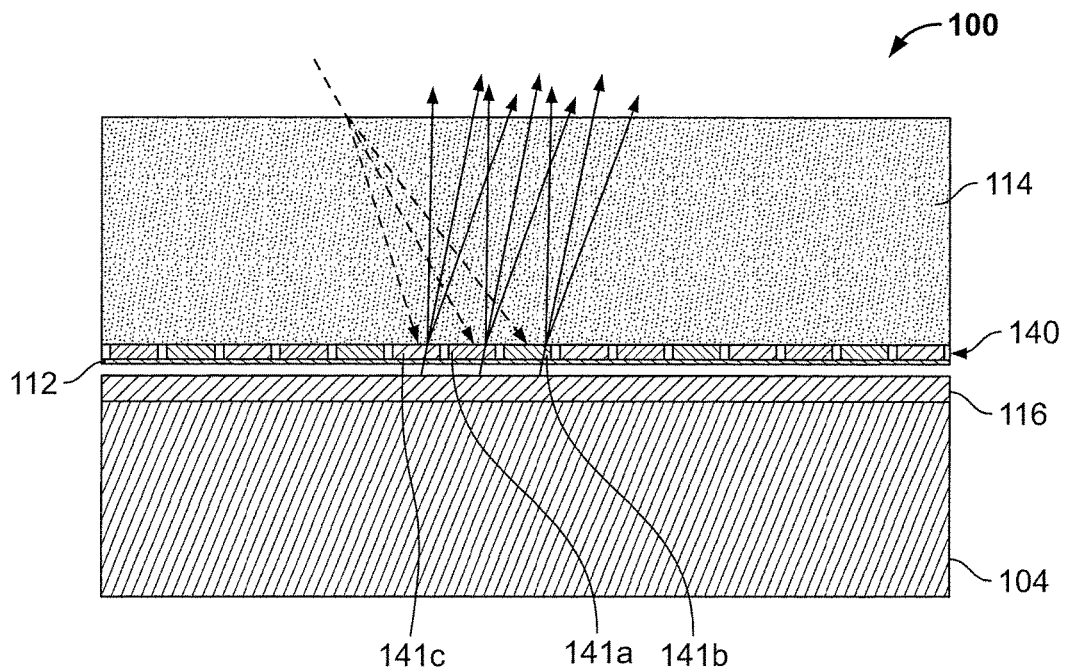
FIG. 7 is a partial cross-sectional view of an example electrowetting display device, according to one embodiment.

Diffusion layer 142 is positioned above color filter layer 140, either directly on color filter layer 140, such as shown in FIG. 4, or at a predetermined distance from the color filter layer, as shown for example in FIGS. 5 and 6. The predetermined distance between diffusion layer 142 and color filter layer 140 is generally shorter than a thickness of a conventional glass top support plate, e.g., 300 micrometers to 500 micrometers. In example embodiments, the distance between diffusion layer 142 and color filter layer 140 is between 0 micrometers and 300 micrometers and, more particularly, between 50 micrometers and 200 micrometers. In certain embodiments, diffusion layer 142 is positioned at a distance from color filter layer 140 equal to or less than a width of each sub-pixel 102 of the plurality of sub-pixels 102, e.g., the respective sub-pixel 102, e.g., between 50 micrometers and 150 micrometers, and, more particularly, 120 micrometers. In particular embodiments, the distance between diffusion layer 142 and color filter layer 140 is between 0 micrometers and a dimension of sub-pixel 102, e.g., a width of sub-pixel 102. In certain embodiments, diffusion layer 142 is positioned at a distance from color filter layer 140 equal to or less than a distance between a center line of a first sub-pixel 102 of the plurality of sub-pixels 102 and a center line of a neighboring or adjacent second sub-pixel 102 of the plurality of sub-pixels 102. For example, in a particular embodiment, the distance between diffusion layer 142 and color filter layer 140 is equal to a shortest distance between a center point of two neighboring or adjacent sub-pixels 102, e.g., 55 micrometers to 115 micrometers, and, more particularly, 65 micrometers to 75 micrometers, with a width of the intervening pixel wall being 5 micrometers to 15 micrometers. In an alternative embodiment, top support plate 114 is doped with suitable diffusion particles having a particle size of 0.5 micrometers to 50 micrometers as shown in FIG. 7 to act as diffusion layer 142.

Referring to FIG. 4, in one embodiment in which diffusion layer 142 is positioned directly on color filter layer 140, with an electric potential applied to electrowetting sub-pixel 102 causing displacement of first fluid 130 disposed within electrowetting sub-pixel 102, light entering electrowetting display device 100 travels through electrowetting sub-pixel 102 and impinges upon reflective layer 116. More specifically, light entering electrowetting display device 100 through top support plate 114 is diffused as the light propagates through diffusion layer 142. The diffused light enters the pixel region, e.g., a sub-pixel 102, through one or more color filters in color filter layer 140. The diffused light is reflected by reflective layer 116 and the reflected light exits the pixel region through color filter layer 140 and diffusion layer 142, where it is further diffused before being emitted from electrowetting display device 100. Because diffusion layer 142 is positioned directly above and contacting color filter layer 140, e.g., a distance of 0 micrometers, slight mixing of diffuse light exiting color filter layer 140 occurs between neighboring or adjacent sub-pixels 102. In this embodiment, color filter layer 140 contacts diffusion layer 142 to limit mixing of light emitted from neighboring or adjacent sub-pixels 102.

In alternative embodiments as shown in FIGS. 5 and 6, diffusion layer 142 is positioned at a predetermined distance from color filter layer 140. In one embodiment, an intermediate support plate 146 is positioned between diffusion layer 142 and color filter layer 140. In this embodiment, a first surface of diffusion layer 142 contacts first surface 144 of top support plate 114, an opposing second surface of diffusion layer 142 contacts a first surface of intermediate support plate 146, and an opposing second surface of intermediate support plate 146 contacts a first surface of color filter layer 140, as shown in FIGS. 5 and 6. Intermediate support plate 146 may be made of any suitable material including, without limitation, glass, plastic, polymer, or other transparent materials, e.g., a transparent polymer layer, a laminated foil, or an applied polymer layer. In this embodiment, intermediate support plate 146 has a suitable thickness, for example, equal to or less than 300 micrometers, and, more particularly, equal to or less than 200 micrometers, and, even more particularly, between 50 micrometers and 200 micrometers. In a particular embodiment, intermediate support plate 146 has a thickness equal to or less than a distance between a center line of a first sub-pixel 102 and a center line of a neighboring or adjacent second sub-pixel 102.

As shown in FIG. 5, light entering electrowetting display device 100 through top support plate 114 is diffused as the light propagates through diffusion layer 142. Because diffusion layer 142 is positioned at a predetermined distance from color filter layer 140, the diffused light enters the pixel region through a plurality of color filters, e.g., red color filter 141a, green color filter 141b, and blue color filter 141c, in color filter layer 140. The diffused light is reflected by reflective layer 116 and the reflected light exits the pixel region through color filter layer 140 and diffusion layer 142, where it is further diffused before being emitted from electrowetting display device 100. In this embodiment, with diffusion layer 142 at a distance above color filter layer 140, e.g., a distance equal to a thickness of intermediate support plate 146 or alternatively a width of sub-pixel 102, considerable mixing of light emitted from diffusion layer 142 occurs between neighboring or adjacent sub-pixels, but only slight mixing, if any, with other sub-pixels 102, i.e., non-neighboring or non-adjacent sub-pixels 102. In a particular embodiment, color filter layer 140 positioned at a distance from diffusion layer 142 equal to a width of respective sub-pixel 120 allows mixing of light emitted from neighboring or adjacent sub-pixels 102 and limits mixing of light emitted from non-neighboring or non-adjacent sub-pixels 102. For example, red light emitted from red color filter 141a may mix slightly with green light emitted from neighboring or adjacent green color filter 141b and may mix slightly with blue light emitted from neighboring or adjacent blue color filter 141c.

As shown in FIG. 6, in a particular embodiment, a second, e.g., an external diffusion layer 148, is positioned on a second surface 150 of top support plate 114 opposite first surface 144. In this embodiment, light emitted from diffusion layer 142 propagates through top support plate 114 and is further diffused as the light exits electrowetting display device 100 through external diffusion layer 148.

Referring to FIG. 7, in an alternative embodiment, color filter layer 140 is positioned directly on top support plate 114. In this embodiment, top support plate 114 is doped with a plurality of suitable diffusion particles having a particle size of 0.5 micrometers to 50 micrometers, for example, to act as diffusion layer 142. Doped top support plate 114 has a thickness equal to or less than 500 micrometers. As shown in FIG. 7, light entering electrowetting display device 100 through doped top support plate 114 is diffused. The diffused light enters the pixel region, e.g., a sub-pixel 102, through a plurality of color filters, e.g., red color filter 141a, green color filter 141b, and blue color filter 141c, in color filter layer 140. The diffused light is reflected by reflective layer 116 and the reflected light exits the pixel region through color filter layer 140 and doped top support plate 114, where it is further diffused before being emitted from electrowetting display device 100. As the light exiting electrowetting display device 100 propagates through doped top support plate 114, the light is further diffused and the diffused light mixes with light emitted from one or more adjacent color filters. For example, red light emitted from red color filter 141a mixes with green light emitted from neighboring or adjacent green color filter 141b and blue light emitted from neighboring or adjacent blue color filter 141c.

In the example embodiments, the predetermined distance can be tuned for optimal performance between diffusion, e.g., viewing angle, and sharpness and resolution of the display. In certain embodiments, before coupling top support plate 114 to bottom support plate 104, a predetermined distance between diffusion layer 142 and color filter layer 140 is adjustable for a desired amount of diffusion of light emitted from the plurality of sub-pixels 102.

Reflective electrowetting display device 100 has a viewing side 160 corresponding to top support plate 114 through which an image formed by reflective electrowetting display device 100 may be viewed, and an opposing rear side 162 corresponding to bottom support plate 104 as shown, for example, in FIGS. 1 and 2. Reflective electrowetting display device 100 may be a segmented display type in which the image is built of segments. The segments may be switched simultaneously or separately. Each segment includes one electrowetting sub-pixel 102 or a number of electrowetting sub-pixels 102 that may be neighboring or adjacent or distant from one another. Electrowetting sub-pixels 102 included in one segment are switched simultaneously, for example. Electrowetting display device 100 may also be an active matrix driven display type or a passive matrix driven display, for example.

In one embodiment, an electrowetting display device includes a first support plate and an opposing second support plate. An electrowetting pixel is positioned between the first support plate and the second support plate. The electrowetting pixel includes a plurality of sub-pixels. A reflective layer is positioned within the electrowetting pixel. A color filter layer between the first support plate and the second support plate is positioned over the electrowetting pixel. The color filter layer includes a plurality of color filters each positioned over a respective sub-pixel of the plurality of sub-pixels. A diffusion layer is between the color filter layer and the second support plate, wherein the diffusion layer is positioned at a first distance from the color filter layer equal to or less than a second distance between a center line of a first sub-pixel of the plurality of sub-pixels and a center line of a second sub-pixel of the plurality of sub-pixels adjacent the first sub-pixel.

In another embodiment, a display device includes a bottom support plate and an opposing top support plate. A pixel region is positioned between the bottom support plate and the top support plate. The pixel region includes a plurality of sub-pixels. A color filter layer is positioned within the pixel region. The color filter layer includes a plurality of color filters, wherein each color filter of the plurality of color filters is positioned within a respective sub-pixel of the plurality of sub-pixels. A diffusion layer is positioned on a first surface of the top support plate between the top support plate and the color filter layer. In this embodiment, a reflective layer is positioned within the respective sub-pixel. A first fluid and a second fluid that is immiscible with the first fluid are contained in the pixel region. An electrode layer is positioned over the first support plate and coupled to a common electrode for creating, in conjunction with the common electrode, a voltage differential between the electrode layer and the common electrode to cause relative displacement of the first fluid and the second fluid to expose at least a portion of the reflective layer.

Figure 8:
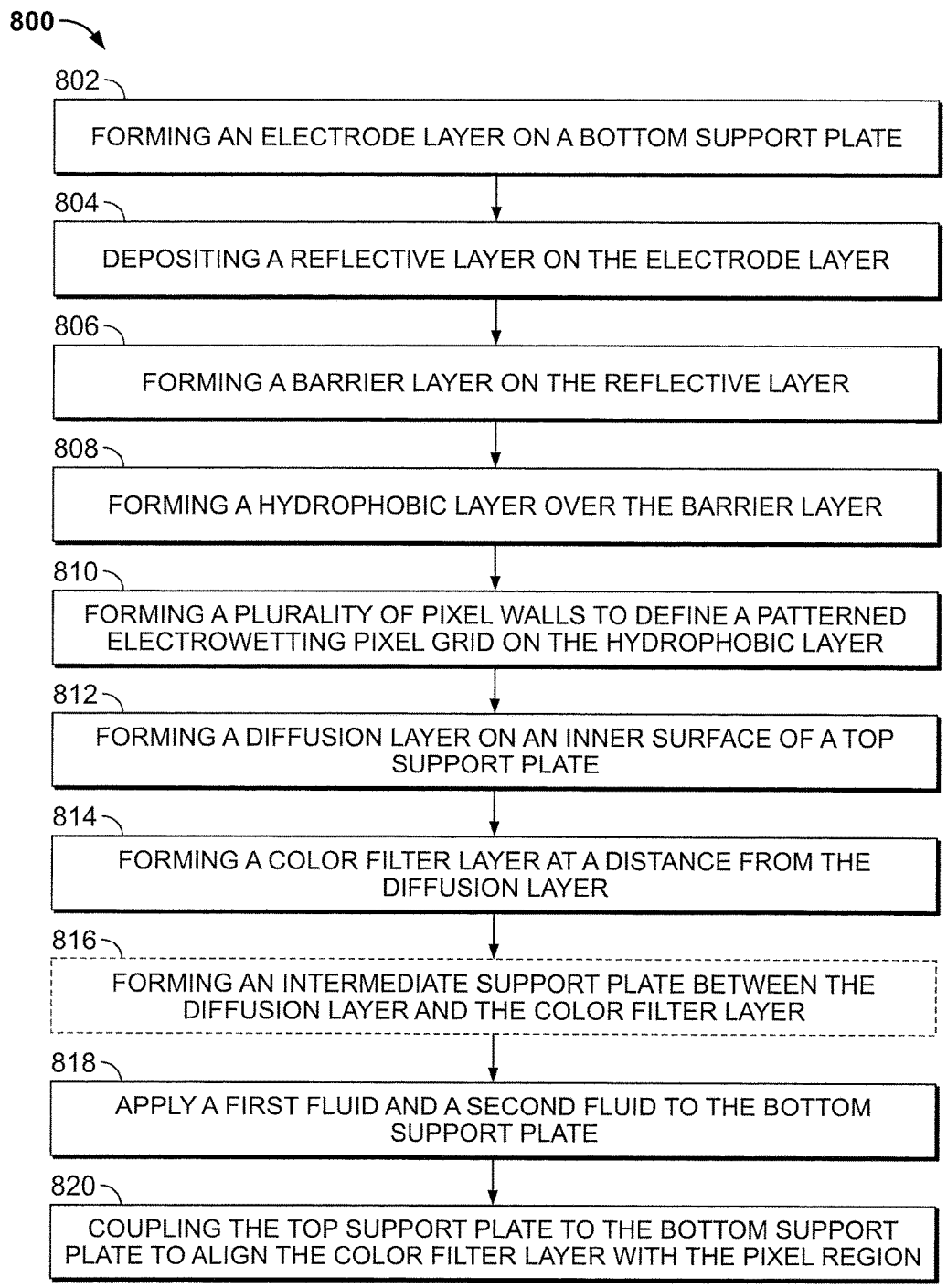
FIG. 8 illustrates an example method for fabricating an electrowetting display device, according to one embodiment.

FIG. 8 is a flow diagram of an example method 800 for fabricating an electrowetting display device, such as electrowetting display device 100 as shown in FIGS. 1-7. Though claimed subject matter is not limited in this respect, process 800 may be performed manually (e.g., by humans) and/or using automated equipment. At block 802, an electrode layer 110 is formed on first or bottom support plate 104. In this embodiment, electrode layer 110 is deposited on bottom support plate 104. Additional layers may be positioned between electrode layer 110 and bottom support plate 104. In one embodiment, a multilayer stack including a first conductive layer is formed on bottom support plate 104. In this embodiment, the first conductive layer is indium tin oxide (ITO), although in alternative embodiments the first conductive layer may be another suitable material. Deposition techniques include, for example, chemical vapor deposition (CVD), physical vapor deposition (PVD), molecular beam epitaxy (MBE), and sputtering. The multilayer stack includes a first dielectric layer deposited on the first conductive layer. The first dielectric layer may comprise SiN, SiON, SiO, or TaO, for example. Any suitable deposition technique may be used, such as CVD, PVD, MBE, and sputtering, for example.

Reflective layer 116 is then deposited 804 on electrode layer 110. One or more additional layers may be positioned between the electrode layer 110 and the reflective layer 116. In one embodiment, reflective layer 116 is the pixel electrode. In this embodiment, reflective layer 116 is positioned with respect to or within a respective display surface area 106 of each electrowetting sub-pixel 102. This process forms reflective layer 116 as shown in FIGS. 1 and 2. A suitable barrier layer 120 is formed 806 on reflective layer 116. A hydrophobic layer, such as an AF 1600® layer, produced by DuPont, based in Wilmington, Del. (e.g., hydrophobic layer 122, shown in FIGS. 1 and 2) is formed 808 over barrier layer 120. At block 810, a plurality of pixel walls 108 are formed to define a patterned electrowetting pixel grid 101 on hydrophobic layer 122. In one embodiment, pixel walls 108 include a photoresist material such as, for example, epoxy-based negative photoresist SU-8. The formed patterned electrowetting pixel grid 101 includes a plurality of rows and a plurality of columns that form an array of electrowetting pixels, such as shown in FIG. 3, including a plurality of electrowetting sub-pixels 102 having a suitable width and length.

In one embodiment, a photoresist material is deposited over the multilayer stack and at block 810 the photoresist material is exposed to a suitable mask to form pixel walls 108. In alternative embodiments, these structures may be printed using suitable methods other than photolithography, including, without limitation, direct writing and electron beam lithography (EBL). The pixel walls 108 are cured and fused together and the uncured portions of the photoresist material are removed to leave pixel walls 108. In an alternative embodiment the pixel wall structure may be formed before the hydrophobic layer is formed.

At block 812, a diffusion layer 142 is applied on, e.g., deposited on, an inner surface 144 of a second or top support plate 114 that faces the pixel region once electrowetting display device 100 is assembled. In the example embodiment, diffusion layer 142 is deposited on top support plate 114. At block 814, a color filter layer 140 is formed, e.g., applied, on or over top support plate 114. More specifically, in one embodiment, color filter layer 140 is formed over diffusion layer 142 at a distance from diffusion layer 142. Color filter layer 140 includes a plurality of color filters, e.g., one or more red color filters 141a, one or more green color filters 141b, and one or more blue color filters 141c. After top support plate 114 is coupled to bottom support plate 104 as described below, each color filter of the plurality of color filters is positioned over or within the pixel region such that each color filter of the plurality of color filters, e.g., red color filter 141a, green color filter 141b, and blue color filter 141c, is aligned with and positioned within a respective sub-pixel 102 of the plurality of sub-pixels 102. In operation, i.e., when a sufficient potential is supplied to open the respective sub-pixel 102, with red color filter 141a positioned over the respective sub-pixel 102, the respective sub-pixel 102 will emit light red in color; with green color filter 141b positioned over the respective sub-pixel 102, the respective sub-pixel 102 will emit light green in color; and with blue color filter 141c positioned over the respective sub-pixel 102, the respective sub-pixel 102 will emit light blue in color.

In one embodiment, forming 814 a color filter layer over diffusion layer 142 at a distance from diffusion layer 142 comprises positioning color filter layer 140 at a first distance from diffusion layer 142 equal to or less than a second distance between a center line of a first sub-pixel 102 of the plurality of sub-pixels and a center line of a second sub-pixel 102 of the plurality of sub-pixels adjacent the first sub-pixel. In an alternative embodiment, forming 814 a color filter layer over diffusion layer 142 at a distance from diffusion layer 142 comprises positioning color filter layer 140 at a distance from diffusion layer 142 equal to or less than a width of the respective sub-pixel 102. In yet another embodiment, forming 814 a color filter layer over diffusion layer 142 at a distance from diffusion layer 142 comprises positioning color filter layer 140 directly on diffusion layer 142 to limit mixing of light emitted from neighboring or adjacent sub-pixels 102 of the plurality of sub-pixels. In another embodiment, forming 814 a color filter layer over diffusion layer 142 at a distance from diffusion layer 142 comprises positioning color filter layer 140 at a distance from diffusion layer 142 equal to a width of the respective sub-pixel 102 to allow mixing of light emitted from neighboring or adjacent sub-pixels 102 of the plurality of sub-pixels and limit mixing of light emitted from non-neighboring or non-adjacent sub-pixels 102 of the plurality of sub-pixels.

In a particular embodiment, method 800 includes coupling 816 a first surface of an intermediate support plate to diffusion layer 142 and coupling a second surface of the intermediate support plate opposite the first surface to color filter layer 140. In this embodiment, intermediate support plate 146 has a suitable thickness, for example, equal to or less than 300 micrometers, and, more particularly, equal to or less than 200 micrometers, and, even more particularly, between 50 micrometers and 200 micrometers. In a particular embodiment, intermediate support plate 146 has a thickness equal to or less than a distance between a center line of a first sub-pixel 102 and a center line of a second sub-pixel 102 adjacent the first sub-pixel 102.

At block 818, first fluid 130 and second fluid 132 are applied to bottom support plate 104 and, at block 820, top support plate 114 is coupled to bottom support plate 104 to align color filter layer 140 with the pixel region. First fluid 130 and second fluid 132 (e.g., the oil and the electrolyte fluid or electrolyte solution) can be disposed within electrowetting sub-pixels 102 of electrowetting display device 100. Top support plate 114 is then coupled to bottom support plate 104 to fabricate electrowetting display device 100. As shown in FIGS. 1 and 2 for example, top support plate 114 is opposite bottom support plate 104, forming opposing outer surfaces of electrowetting display device 100.

Figure 9:
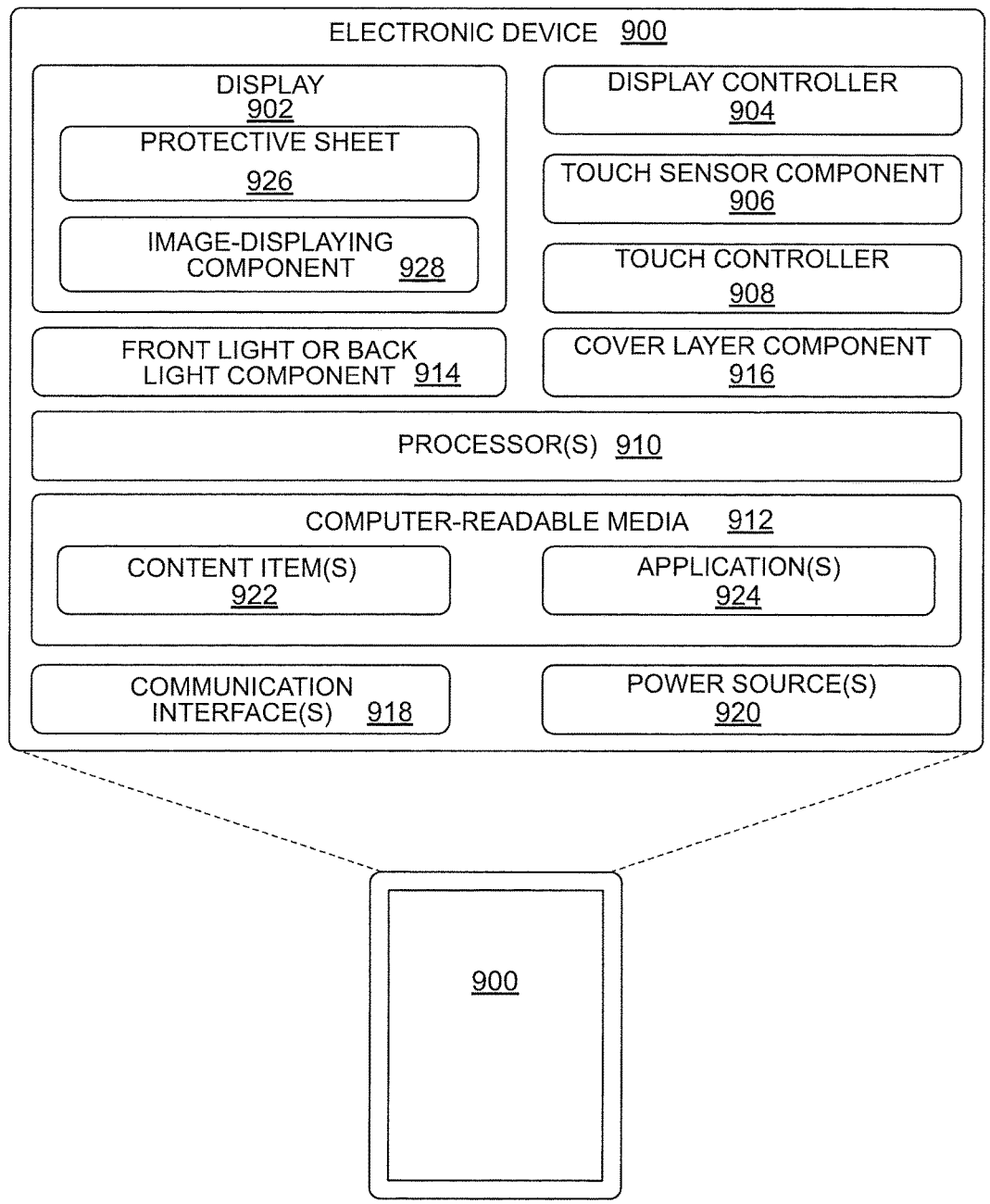
FIG. 9 illustrates an example electronic device that may incorporate an electrowetting display device, according to various embodiments.

FIG. 9 illustrates an example electronic device 900 that may incorporate any of the display devices discussed above. Electronic device 900 may comprise any type of electronic device having a display. For instance, electronic device 900 may be a mobile electronic device (e.g., an electronic book reader, a tablet computing device, a laptop computer, a smart phone or other multifunction communication device, a portable digital assistant, a wearable computing device, or an automotive display). Alternatively, electronic device 900 may be a non-mobile electronic device (e.g., a computer display or a television). In addition, while FIG. 9 illustrates several example components of electronic device 900, it is to be appreciated that electronic device 900 may also include other conventional components, such as an operating system, system busses, input/output components, and the like. Further, in other embodiments, such as in the case of a television or computer monitor, electronic device 900 may only include a subset of the components illustrated.

Regardless of the specific implementation of electronic device 900, electronic device 900 includes a display 902 and a corresponding display controller 904. Display 902 may represent a reflective or transmissive display in some instances or, alternatively, a transflective display (partially transmissive and partially reflective).

In one embodiment, display 902 comprises an electrowetting display that employs an applied voltage to change the surface tension of a fluid in relation to a surface. For example, such an electrowetting display may include the array of sub-pixels 102 illustrated in FIG. 3, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of display 902 are independently activated, display 902 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "white" value of the pixel may correspond to a deepest red of the color filter. Furthermore, while some examples herein are described in the environment of a reflective display, in other examples, display 902 may represent a backlit display, examples of which are mentioned above.

In addition to including display 902, FIG. 9 illustrates that some examples of electronic device 900 may include a touch sensor component 906 and a touch controller 908. In some instances, at least one touch sensor component 906 resides with, or is stacked on, display 902 to form a touch-sensitive display. Thus, display 902 may be capable of both accepting user touch input and rendering content in response to or corresponding to the touch input. As several examples, touch sensor component 906 may comprise a capacitive touch sensor, a force sensitive resistance (FSR), an interpolating force sensitive resistance (IFSR) sensor, or any other type of touch sensor. In some instances, touch sensor component 906 is capable of detecting touches as well as determining an amount of pressure or force of these touches.

FIG. 9 further illustrates that electronic device 900 may include one or more processors 910 and one or more computer-readable media 912, as well as a front light component 914 (which may alternatively be a backlight component in the case of a backlit display) for lighting display 902, a cover layer component 916, such as a cover glass or cover sheet, one or more communication interfaces 918 and one or more power sources 920. The communication interfaces 918 may support both wired and wireless connection to various networks, such as cellular networks, radio, WiFi networks, short range networks (e.g., Bluetooth®), and infrared (IR) networks, for example.

Depending on the configuration of electronic device 900, computer-readable media 912 (and other computer-readable media described throughout) is an example of computer storage media and may include volatile and nonvolatile memory. Thus, computer-readable media 912 may include, without limitation, RAM, ROM, EEPROM, flash memory, and/or other memory technology, and/or any other suitable medium that may be used to store computer-readable instructions, programs, applications, media items, and/or data which may be accessed by electronic device 900.

Computer-readable media 912 may be used to store any number of functional components that are executable on processor 910, as well as content items 922 and applications 924. Thus, computer-readable media 912 may include an operating system and a storage database to store one or more content items 922, such as eBooks, audio books, songs, videos, still images, and the like. Computer-readable media 912 of electronic device 900 may also store one or more content presentation applications to render content items on electronic device 900. These content presentation applications may be implemented as various applications 924 depending upon content items 922. For instance, the content presentation application may be an electronic book reader application for rending textual electronic books, an audio player for playing audio books or songs, or a video player for playing video.

In some instances, electronic device 900 may couple to a cover (not illustrated in FIG. 9) to protect the display 902 (and other components in the display stack or display assembly) of electronic device 900. In one example, the cover may include a back flap that covers a back portion of electronic device 900 and a front flap that covers display 902 and the other components in the stack. Electronic device 900 and/or the cover may include a sensor (e.g., a Hall effect sensor) to detect whether the cover is open (i.e., if the front flap is not atop display 902 and other components). The sensor may send a signal to front light component 914 if the cover is open and, in response, front light component 914 may illuminate display 902. If the cover is closed, meanwhile, front light component 914 may receive a signal indicating that the cover has closed and, in response, front light component 914 may turn off.

Furthermore, the amount of light emitted by front light component 914 may vary. For instance, upon a user opening the cover, the light from the front light may gradually increase to its full illumination. In some instances, electronic device 900 includes an ambient light sensor (not illustrated in FIG. 9) and the amount of illumination of front light component 914 may be based at least in part on the amount of ambient light detected by the ambient light sensor. For example, front light component 914 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 902 may vary depending on whether front light component 914 is on or off, or based on the amount of light provided by front light component 914. For instance, electronic device 900 may implement a larger default font or a greater contrast when the light is off compared to when the light is on. In some embodiments, electronic device 900 maintains, if the light is on, a contrast ratio for display 902 that is within a certain defined percentage of the contrast ratio if the light is off.

As described above, touch sensor component 906 may comprise a capacitive touch sensor that resides atop display 902. In some examples, touch sensor component 906 may be formed on or integrated with cover layer component 916. In other examples, touch sensor component 906 may be a separate component in the stack of the display assembly. Front light component 914 may reside atop or below touch sensor component 906. In some instances, either touch sensor component 906 or front light component 914 is coupled to a top surface of a protective sheet 926 of display 902. As one example, front light component 914 may include a lightguide sheet and a light source (not illustrated in FIG. 9). The lightguide sheet may comprise a substrate (e.g., a transparent thermoplastic such as PMMA or other acrylic), a layer of lacquer and multiple grating elements formed in the layer of lacquer that function to propagate light from the light source towards display 902; thus, illuminating display 902.

Cover layer component 916 may include a transparent substrate or sheet having an outer layer that functions to reduce at least one of glare or reflection of ambient light incident on electronic device 900. In some instances, cover layer component 916 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, protective sheet 926 may include a similar UV-cured hard coating on the outer surface. Cover layer component 916 may couple to another component or to protective sheet 926 of display 902. Cover layer component 916 may, in some instances, also include a UV filter, a UV-absorbing dye, or the like, for protecting components lower in the stack from UV light incident on electronic device 900. In still other examples, cover layer component 916 may include a sheet of high-strength glass having an antiglare and/or antireflective coating.

Display 902 includes protective sheet 926 overlying an image-displaying component 928. For example, display 902 may be preassembled to have protective sheet 926 as an outer surface on the upper or image-viewing side of display 902. Accordingly, protective sheet 926 may be integral with and may overlay image-displaying component 928. Protective sheet 926 may be optically transparent to enable a user to view, through protective sheet 926, an image presented on image-displaying component 928 of display 902.

In some examples, protective sheet 926 may be a transparent polymer film in the range of 25 to 200 micrometers in thickness. As several examples, protective sheet 926 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 926 may include a coating, such as the hard coating described above. For instance, the hard coating may be applied to the outer surface of protective sheet 926 before or after assembly of protective sheet 926 with image-displaying component 928 of display 902. In some examples, the hard coating may include a photoinitiator or other reactive species in its composition, such as for curing the hard coating on protective sheet 926. Furthermore, in some examples, protective sheet 926 may be dyed with a UV-light-absorbing dye, or may be treated with other UV-absorbing treatment. For example, protective sheet 926 may be treated to have a specified UV cutoff such that UV light below a cutoff or threshold wavelength is at least partially absorbed by protective sheet 926, thereby protecting image-displaying component 928 from UV light.

According to some embodiments herein, one or more of the components discussed above may be coupled to display 902 using fluid optically-clear adhesive (LOCA). For example, the light guide portion of front light component 914 may be coupled to display 902 by placing LOCA on the outer or upper surface of protective sheet 926. If the LOCA reaches the corner(s) and/or at least a portion of the perimeter of protective sheet 926, UV-curing may be performed on the LOCA at the corners and/or the portion of the perimeter. Thereafter, the remaining LOCA may be UV-cured and front light component 914 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 914. In other embodiments, the LOCA may be placed near a center of protective sheet 926, and pressed outwards towards a perimeter of the top surface of protective sheet 926 by placing front light component 914 on top of the LOCA. The LOCA may then be cured by directing UV light through front light component 914. As discussed above, and as discussed additionally below, various techniques, such as surface treatment of the protective sheet, may be used to prevent discoloration of the LOCA and/or protective sheet 926.

While FIG. 9 illustrates a few example components, electronic device 900 may have additional features or functionality. For example, electronic device 900 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 900 may reside remotely from electronic device 900 in some implementations. In these implementations, electronic device 900 may utilize communication interfaces 918 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
   a first support plate and a second support plate which opposes the first support plate;
   an electrowetting pixel positioned between the first support plate and the second support plate, the first support plate positioned on a first side of the electrowetting pixel and the second support plate positioned on a second side of the electrowetting pixel opposite the first side, the electrowetting pixel comprising a first sub-pixel and a second sub-pixel which is adjacent to the first sub-pixel;
   a reflective layer positioned within the electrowetting pixel;
   a color filter layer positioned on the second side of the electrowetting pixel between the first support plate and the second support plate, the color filter layer comprising a first color filter positioned over the first sub-pixel and a second color filter positioned over the second sub-pixel, wherein the first color filter is of a first color and the second color filter is of a second color; and
   a diffusion layer between the color filter layer and the second support plate and in direct contact with the color filter layer,
   wherein the diffusion layer is configured to mix light of the first color transmitted through the first color filter with light of the second color transmitted through the second color filter.

2. A display device, comprising:
   a bottom support plate and a top support plate which opposes the bottom support plate;
   a pixel region positioned between the bottom support plate and the top support plate, the bottom support plate positioned on a first side of the pixel region and the top support plate positioned on a second side of the pixel region opposite the first side, the pixel region comprising a first sub-pixel and a second sub-pixel which is adjacent to the first sub-pixel;
   a first fluid and a second fluid that is immiscible with the first fluid, the first fluid and the second fluid in the pixel region;
   a color filter layer positioned on the second side of the pixel region over the first fluid and the second fluid within the pixel region, the color filter layer comprising a first color filter positioned within the first sub-pixel and a second color filter positioned within the second sub-pixel, wherein the first color filter is of a first color and the second color filter is of a second color; and
   a diffusion layer positioned on a first surface of the top support plate between the top support plate and the color filter layer, the diffusion layer in direct contact with the color filter layer,
   wherein the diffusion layer is configured to mix light of the first color transmitted through the first color filter with light of the second color transmitted through the second color filter.

3. The display device of claim 2, further comprising:
   a reflective layer positioned within the pixel region;
   a common electrode; and
   an electrode layer positioned over the first support plate for creating, in conjunction with the common electrode, a voltage differential between the electrode layer and the common electrode to cause relative displacement of the first fluid and the second fluid to expose at least a portion of the reflective layer.

4. The display device of claim 2, further comprising a second diffusion layer positioned on a second surface of the top support plate opposite the first surface.

5. A display device, comprising:
   a bottom plate and a top plate which opposes the bottom plate;
   a pixel region positioned between the bottom plate and the top plate, the bottom plate positioned on a first side of the pixel region and the top plate positioned on a second side of the pixel region opposite the first side, the pixel region comprising a first sub-pixel and a second sub-pixel which is adjacent to the first sub-pixel;
   a color filter layer positioned on the second side of the pixel region, the color filter layer comprising a first color filter positioned within the first sub-pixel and a second color filter positioned within the second sub-pixel, wherein the first color filter is of a first color and the second color filter is of a second color;
   a diffusion layer positioned between the top plate and the color filter layer, wherein the diffusion layer is configured to mix light of the first color transmitted through the first color filter with light of the second color transmitted through the second color filter; and an intermediate plate positioned between the diffusion layer and the color filter layer, wherein a first surface of the diffusion layer contacts first surface of the top plate, a second surface of the diffusion layer which opposes the first surface of the diffusion layer directly contacts a first surface of the intermediate plate, and a second surface of the intermediate plate which opposes the first surface of the intermediate plate directly contacts a first surface of the color filter layer.

6. The display device of claim 5, wherein the intermediate plate has a thickness equal to or less than a distance between a center line of the first sub-pixel and a center line of the second sub-pixel.

7. The display device of claim 5, wherein the intermediate plate has a thickness equal to or less than a width of the first sub-pixel.

8. The display device of claim 5, wherein a distance between the diffusion layer and the color filter layer is based on a concentration of diffuse particles within the diffusion layer.

9. The display device of claim 5, further comprising:
a reflective layer positioned within the pixel region;
a common electrode; and
an electrode layer positioned over the bottom plate for creating, in conjunction with the common electrode, a voltage differential between the electrode layer and the common electrode to cause relative displacement of a first fluid and a second fluid within the pixel region to expose at least a portion of the reflective layer.

10. The display device of claim 5, further comprising a second diffusion layer positioned on a second surface of the top plate opposite the first surface.

11. A method for fabricating an electrowetting display device, the method comprising:
forming a pixel region between a first support plate and a second support plate, the first support plate positioned on a first side of the pixel region and the second support plate positioned on a second side of the pixel region opposite the first side, the pixel region comprising a first sub-pixel and a second sub-pixel adjacent to the first sub-pixel;
forming a diffusion layer on a first surface of the first support plate facing the pixel region; and
forming a color filter layer on the first side of the pixel region over the first surface of the first support plate such that the color filter layer is directly on the diffusion layer, the color filter layer comprising a first color filter positioned within the first sub-pixel and a second color filter positioned within the second sub-pixel,
wherein the forming the diffusion layer comprises forming the diffusion layer such that the diffusion layer is configured to mix light of the first color transmitted through the first color filter with light of the second color transmitted through the second color filter.

12. The method of claim 11, further comprising forming a second diffusion layer on a second surface of the first support plate opposite the first surface.

* * * * *

UNITED STATES PATENT AND TRADEMARK OFFICE
CERTIFICATE OF CORRECTION

PATENT NO. : 10,365,471 B1
APPLICATION NO. : 14/975346
DATED : July 30, 2019
INVENTOR(S) : Langendijk et al.

It is certified that error appears in the above-identified patent and that said Letters Patent is hereby corrected as shown below:

In the Claims

Column 21, Line 6, Claim 5, delete "contacts first" and insert -- contacts a first --, therefor.

Signed and Sealed this
Twenty-second Day of October, 2019

Andrei Iancu
*Director of the United States Patent and Trademark Office*